(12) United States Patent
Sawada et al.

(10) Patent No.: US 9,243,436 B2
(45) Date of Patent: Jan. 26, 2016

(54) SPRING HOOK STRUCTURE

(71) Applicant: YAZAKI CORPORATION, Minato-ku, Tokyo (JP)

(72) Inventors: Tsutomu Sawada, Kakegawa (JP); Norihisa Yamada, Kakegawa (JP); Takashi Tsukamoto, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/611,377

(22) Filed: Feb. 2, 2015

(65) Prior Publication Data

US 2015/0143751 A1     May 28, 2015

Related U.S. Application Data

(63) Continuation of application No. PCT/JP2013/070752, filed on Jul. 31, 2013.

(30) Foreign Application Priority Data

Aug. 6, 2012   (JP) ................................ 2012-173807

(51) Int. Cl.
    *H01R 13/447*     (2006.01)
    *E05F 1/10*     (2006.01)
    *H01R 13/506*     (2006.01)
    *H01R 13/52*     (2006.01)
(Continued)

(52) U.S. Cl.
CPC ................ *E05F 1/1008* (2013.01); *F16F 1/04* (2013.01); *F16F 1/12* (2013.01); *H01R 13/506* (2013.01); *H01R 13/5213* (2013.01); *H01R 13/635* (2013.01)

(58) Field of Classification Search
CPC . H01R 13/447; H01R 13/5213; H01R 13/639
See application file for complete search history.

(56) References Cited

U.S. PATENT DOCUMENTS 4,713,017 A * 12/1987 Pesapane ............. H01R 13/447
                                                                   439/142
5,571,023 A * 11/1996 Anthony ................... H02G 3/14
                                                                   220/242
(Continued)

FOREIGN PATENT DOCUMENTS

JP          8-169460 A     7/1996
JP         10-152071 A     6/1998
(Continued)

OTHER PUBLICATIONS

International Search Report of PCT/JP2013/070752, dated Oct. 15, 2013. [PCT/ISA/210].

*Primary Examiner* — Gary Paumen
(74) *Attorney, Agent, or Firm* — Sughrue Mion, PLLC (57) ABSTRACT

A spring hook structure includes: a torsion coil spring including a coil portion and a first arm and a second arm extending from each side of the coil portion; and a rotation support pin by which a cap is rotatably supported on an exterior case. The rotation support pin is inserted into the coil portion. The first arm is hooked on a first hook surface of the exterior case, and the second arm is hooked on a second hook surface of the cap. At least one of the exterior case and the cap is provided with a regulation wall at a position not interfering with the arm moving along the hook surface due to flexural deformation of the coil portion but interfering with the arm moving along the hook surface due to flexural deformation of the arm.

2 Claims, 7 Drawing Sheets

(51) Int. Cl.
*F16F 1/04* (2006.01)
*F16F 1/12* (2006.01)
*H01R 13/635* (2006.01)

(56) References Cited

U.S. PATENT DOCUMENTS

| | | | | |
|---|---|---|---|---|
| 5,747,739 | A * | 5/1998 | Moeller | B60R 16/0239 174/53 |
| 6,171,118 | B1 * | 1/2001 | Witkowski | H01R 13/447 439/142 |
| 6,416,336 | B1 * | 7/2002 | Schulte | A47B 21/06 439/131 |
| 6,554,626 | B2 * | 4/2003 | Ramos, Jr. | H01R 13/405 439/144 |
| 6,971,883 | B1 * | 12/2005 | Ridge | H01R 13/516 439/142 |
| 8,357,852 | B2 * | 1/2013 | Drane | H02G 3/185 174/66 |
| 8,535,071 | B1 * | 9/2013 | Mueller | B60D 1/64 439/144 |
| 2002/0142637 | A1 * | 10/2002 | Rhude | H01R 13/60 439/142 |
| 2006/0009056 | A1 * | 1/2006 | Guzeldereli | H01R 13/447 439/142 |
| 2008/0026616 | A1 * | 1/2008 | Cummings | H01R 13/745 439/142 |
| 2008/0142637 | A1 * | 6/2008 | Lesage | H01R 13/5213 244/129.1 |
| 2010/0105227 | A1 * | 4/2010 | Vonnegut | H01R 13/6658 439/142 |
| 2014/0206211 | A1 * | 7/2014 | Coughlan | H01R 13/447 439/142 |
| 2014/0370732 | A1 * | 12/2014 | Curtis | H01R 24/76 439/142 |

FOREIGN PATENT DOCUMENTS

| | | |
|---|---|---|
| JP | 2010-166756 A | 7/2010 |
| JP | 2012-18838 A | 1/2012 |

\* cited by examiner

SPRING HOOK STRUCTURE

CROSS REFERENCE TO RELATED APPLICATIONS

This application is a continuation of International Application No. PCT/JP2013/070752, filed Jul. 31, 2013, and based upon and claims the benefit of priority from Japanese Patent Application No. 2012-173807, filed Aug. 6, 2012, the entire contents of all of which are incorporated herein by reference.

TECHNICAL FIELD

This application relates to a spring hook structure interposed between a fixed member and a movable member rotatably supported on the fixed member.

BACKGROUND ART

A charging inlet device is installed in a vehicle such as an electric vehicle (EV) and a hybrid electric vehicle (HEV) for charging a battery mounted on the vehicle. A spring hook structure is applied to the charging inlet device to open and close a cap (refer to JP 2010-166756 A and JP H10-152071 A).

Figure 1:
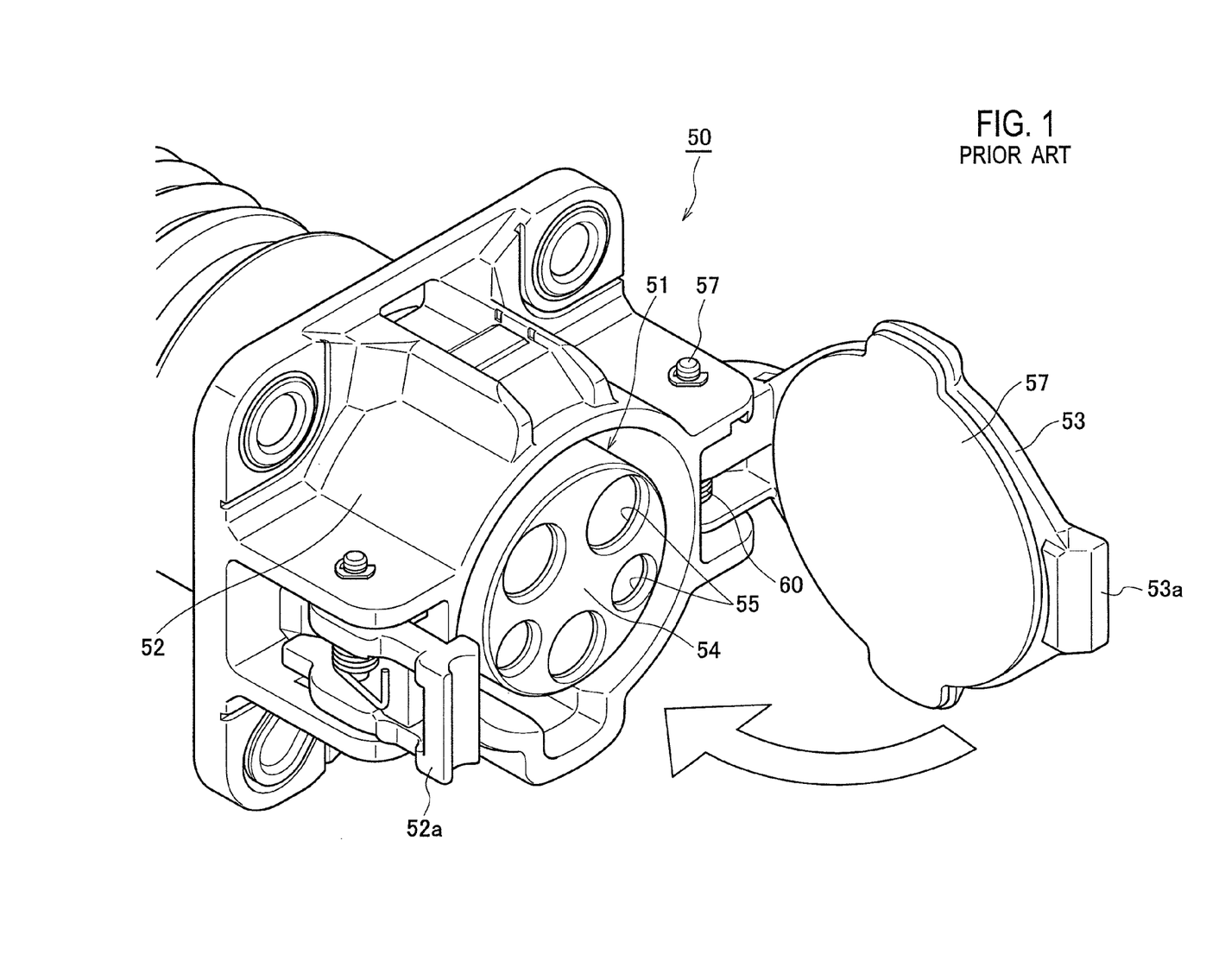
FIG. 1 is a perspective view illustrating a charging inlet device using a spring hook structure of a conventional example.

FIG. 1 illustrates a charging inlet device using a spring hook structure of a conventional example.

As illustrated in FIG. 1, charging inlet device 50 includes a connector housing 51 housing terminals (not illustrated) therein, an exterior case 52 placed to cover the circumference of the connector housing 51, and a cap 53 rotatably supported on one side of the exterior case 52.

The connector housing 51 is formed into a cylindrical shape and includes a front wall 54 blocking the front of the cylindrical shape. The front wall 54 is provided with a plurality of terminal insertion holes 55. Mating terminals (not illustrated) are inserted through the respective terminal insertion holes 55. The inserted mating terminals are then electrically connected to the terminals (not illustrated) housed in the connector housing 51.

The exterior case 52 is provided with a cap locking portion 52a.

A packing 56 is placed on the inner surface of the cap 53. The cap 53 is arranged to be rotatable via a rotation support pin 57 between a closed position where the cap 53 is tightly attached to the front wall 54 to block the terminal insertion holes 55 and an open position (as illustrated in FIG. 1) where the cap 53 is separated from the front wall 54 to open the terminal insertion holes 55 to the outside. The cap 53 is biased by a spring hook structure toward the open position.

Figure 2A:
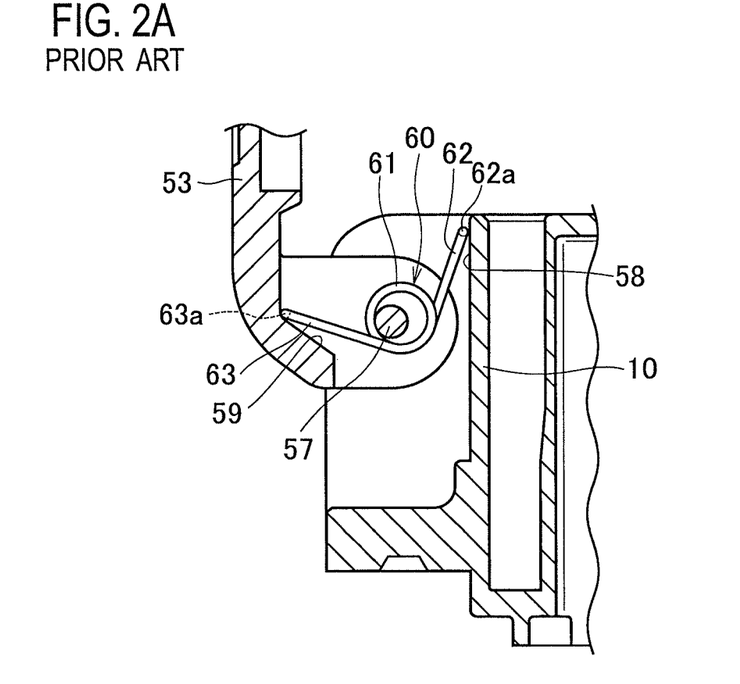
FIG. 2A is a cross-sectional view illustrating the spring hook structure of the conventional example when a cap is located in an open position.
Figure 2B:
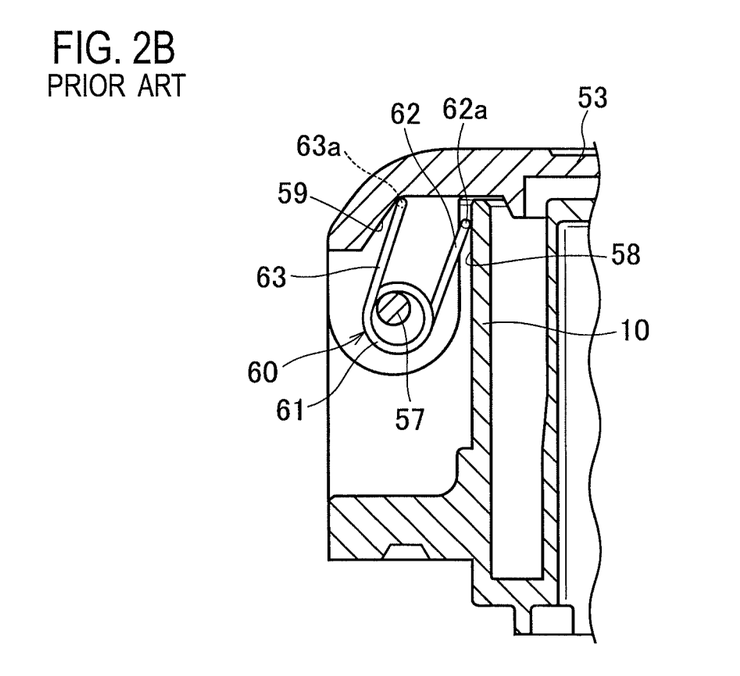
FIG. 2B is a cross-sectional view illustrating the spring hook structure of the conventional example when the cap is located in a closed position.
Figure 3:
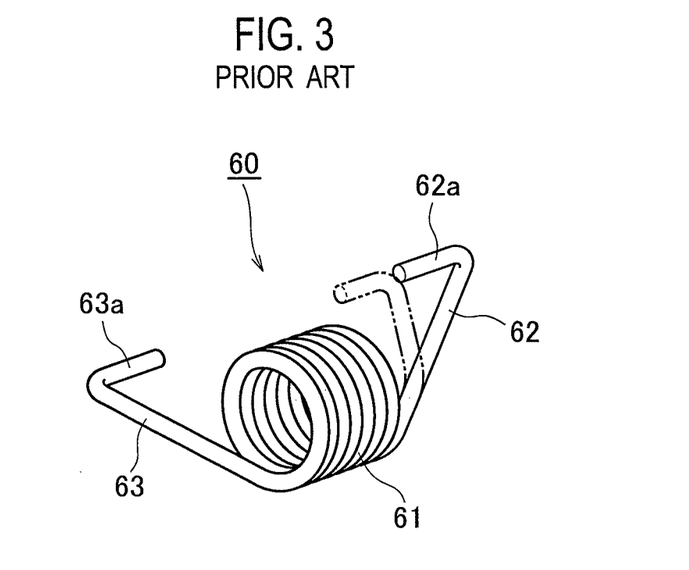
FIG. 3 is a perspective view illustrating a torsion coil spring of the spring hook structure of the conventional example.

As illustrated in FIGS. 2 and 3, the spring hook structure of the conventional example includes a torsion coil spring 60. The torsion coil spring 60 includes a coil portion 61, and a first arm 62 and a second arm 63 extending from each side of the coil portion 61. The rotation support pin 57 is inserted in the coil portion 61. The first arm 62 is hooked on a hook surface 58 of the exterior case 52, and the second arm 63 is hooked on a hook surface 59 of the cap 53. The torsion coil spring 60 biases the cap 53 toward the open position.

When the cap 53 is turned from the open position to the closed position against the spring force of the torsion coil spring 60, a locked portion 53a of the cap 53 is locked with the cap locking portion 52a. The cap 53 is thus held in the closed position. Once the lock of the cap locking portion 52a is released, the cap 53 is rotated from the closed position to the open position due to the spring force of the torsion coil spring 60. Thus, a user is not required to open the cap 52 by hand.

In the spring hook structure of the conventional example, the torsion coil spring 60 is attached in a manner such that the rotation support pin 57 is inserted into the coil portion 61, a tip portion 62a of the first arm 62 is placed on the first hook surface 58, and a tip portion 63a of the second arm 63 is placed on the second hook surface 59. Namely, the torsion coil spring 60 is not required to be hooked on hook portions or the like for positioning the tip portions 62a and 63a of the paired arms 62 and 63, so as to facilitate the process of attaching the torsion coil spring 60.

SUMMARY

Figure 4:
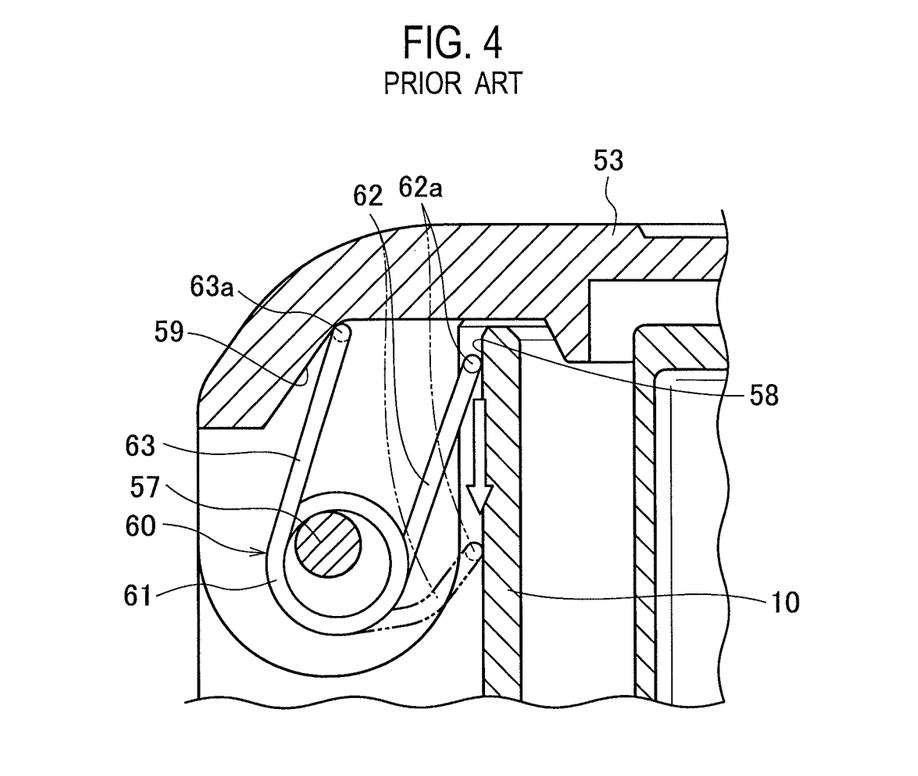
FIG. 4 is a cross-sectional view illustrating the spring hook structure of the conventional example while explaining a movement of a first arm when an excessive load acts on the first arm.

In the spring hook structure of the conventional example, if moisture such as rainwater adheres to the coil portion 61 in the state where the cap 53 is located in the open position, and the adhering moisture then freezes, the torsional movement of the coil portion 61 may be prevented. In addition, if the user moves the cap 53 from the open position to the closed position in the state where the coil portion 61 cannot freely rotate, an excessive load acts on the respective arms 62 and 63. As a result, for example, the tip portion 62a of the first arm 62 slides on the first hook surface 58 while the first arm 62 is subjected to flexural deformation, as illustrated in FIG. 4. This may lead to plastic deformation of the first arm 62 beyond its elastic deformation capacity, or may lead to a situation where the tip portion 62a of the first arm 62 falls off the first hook surface 58. If the first arm 62 is subjected to plastic deformation, the spring force of the torsion coil spring 60 decreases so as not to fulfill the open-close supporting function appropriately. If the tip portion 62a of the first arm 62 falls off the first hook surface 58, the spring force is no longer effective and accordingly, the open-close supporting function is damaged.

Here, some measures may be taken to prevent moisture from freezing by applying grease or the like to the coil portion 61 or to improve the strength of the torsion coil spring 60 by increasing the diameter thereof. However, these measures lead to an increase in cost.

The present invention has been made to solve the above-described problems. An object of the present invention is to provide a spring hook structure capable of preventing damage of a torsion coil spring caused by excessive deformation thereof even if moisture adhering thereto freezes while preventing an increase in cost.

A spring hook structure according to a first aspect of the present invention interposed between a fixed member and a movable member rotatably supported on the fixed member, includes a torsion coil spring, a rotation support pin, a first hook surface, a second hook surface, and at least one of a first regulation wall and a second regulation wall. The torsion coil spring includes a coil portion, a first arm extending from one side of the coil portion, and a second arm extending from the other side of the coil portion. The rotation support pin rotatably supports the movable member on the fixed member and is inserted into the coil portion. The first hook surface is formed in the fixed member, and the first arm is hooked thereon. The second hook surface is formed in the movable member, and the second arm is hooked thereon. The first regulation wall is formed in the fixed member at a position not interfering with the first arm moving along the first hook surface when the coil spring is subjected to flexural deformation but interfering with the first arm moving along the first hook surface when the first arm is subjected to flexural deformation. The second regulation wall is formed in the movable member at a position not interfering with the second arm moving along the second hook surface when the coil portion is subjected to flexural deformation but interfering with the second arm moving along the second hook surface when the second arm is subjected to flexural deformation.

The fixed member may be an exterior case placed to cover the peripheral surface of a connector housing, and the movable member may be a cap placed to open and close terminal insertion holes of the connector housing.

According to the spring hook structure of the first aspect of the present invention, the respective regulation walls can prevent excessive flexural deformation of the respective arms of the torsion coil spring and prevent the respective arms from falling off the respective hook surfaces. Namely, excessive deformation of the respective arms of the torsion coil spring can be prevented only by provision of the respective regulation walls to the fixed member and the movable member. Accordingly, damage of the torsion coil spring caused by excessive deformation of the respective arms of the torsion coil spring can be prevented even if moisture adhering thereto freezes while an increase in cost is prevented.

DETAILED DESCRIPTION

Hereinafter, an embodiment will be explained with reference to the drawings.

FIGS. 5 to 8B are views each illustrating a charging inlet device applying a spring hook structure according to the embodiment.

As illustrated in FIGS. 5 to 7B, the charging inlet device 1 applying the spring hook structure according to the embodiment includes a connector housing 2 housing terminals (not illustrated) therein, an exterior case 10 as a fixed member placed to cover the peripheral surface of the connector housing 2, and a cap 20 as a movable member rotatably supported on one side of the exterior case 10.

Figure 5:
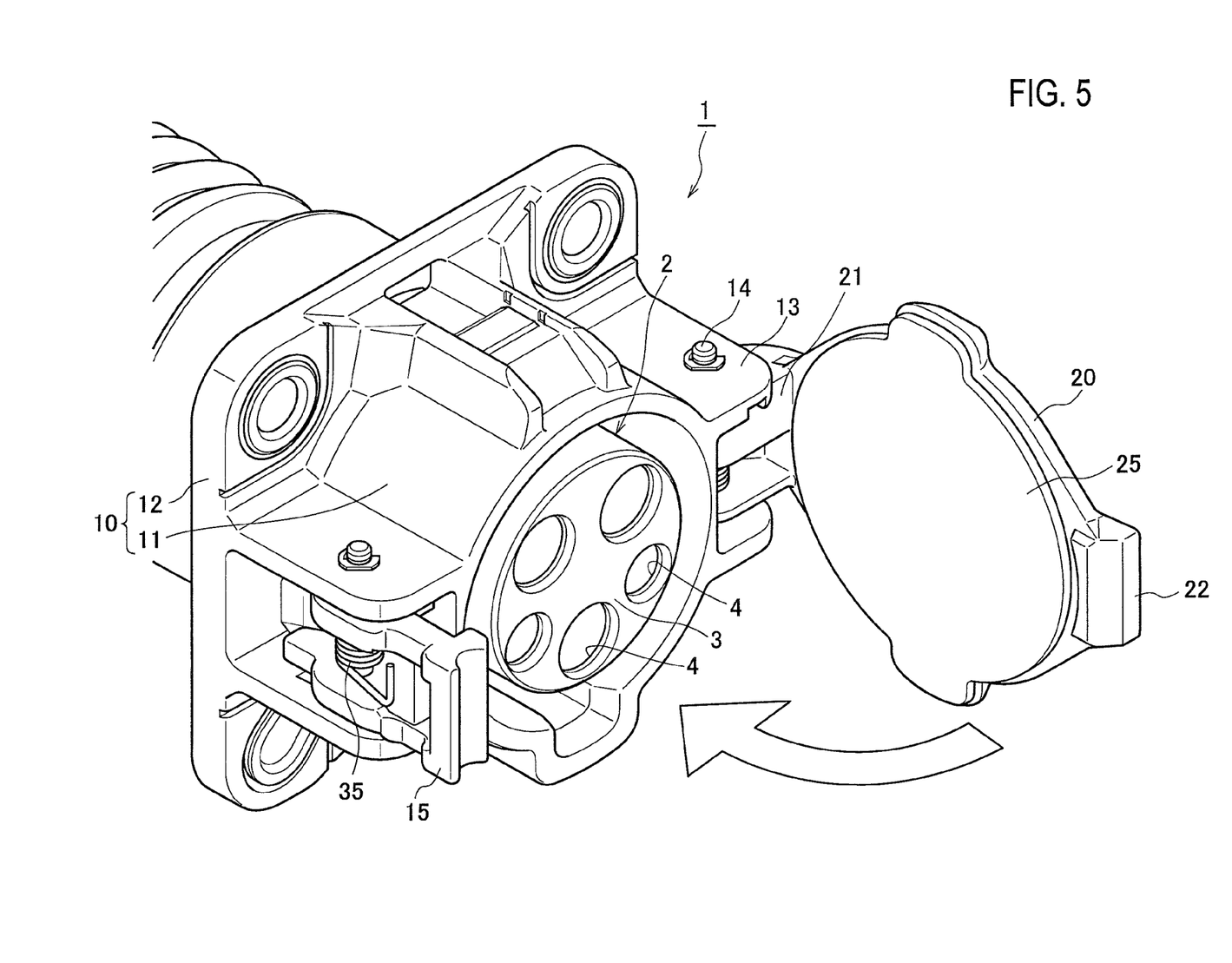
FIG. 5 is a perspective view illustrating a charging inlet device using a spring hook structure according to an embodiment when a cap is located in an open position.

The connector housing 2 is formed into a cylindrical shape and includes a front wall 3 blocking the front of the cylindrical shape. The front wall 3 is provided with a plurality of terminal insertion holes 4. Mating terminals (not illustrated) are inserted through the respective terminal insertion holes 4. The inserted mating terminals are thus electrically connected to the terminals (not illustrated) housed in the connector housing 2.

The exterior case 10 includes a fitting case 11 formed substantially into a cylindrical shape, and a bracket 12 integrally formed on the rear side of the fitting case 11. The charging inlet device 1 is fixed to the vehicle via the bracket 12. The region between the fitting case 11 and the circumference of the connector housing 2 serves as a fitting space S for a mating connector housing (not illustrated) to be connected (for example, on the charging stand side).

A pair of cap support portions 13 is provided on one side of the fitting case 11. A rotation support pin 14 is fixed to the cap support portions 13.

A cap locking portion 15 is provided on the other side of the fitting case 11. The cap locking portion 15 is supported on the fitting case 11 to be swingable between a lock position and a lock-release position. The cap locking portion 15 is biased by a torsion coil spring 35 toward the lock position.

Figure 6:
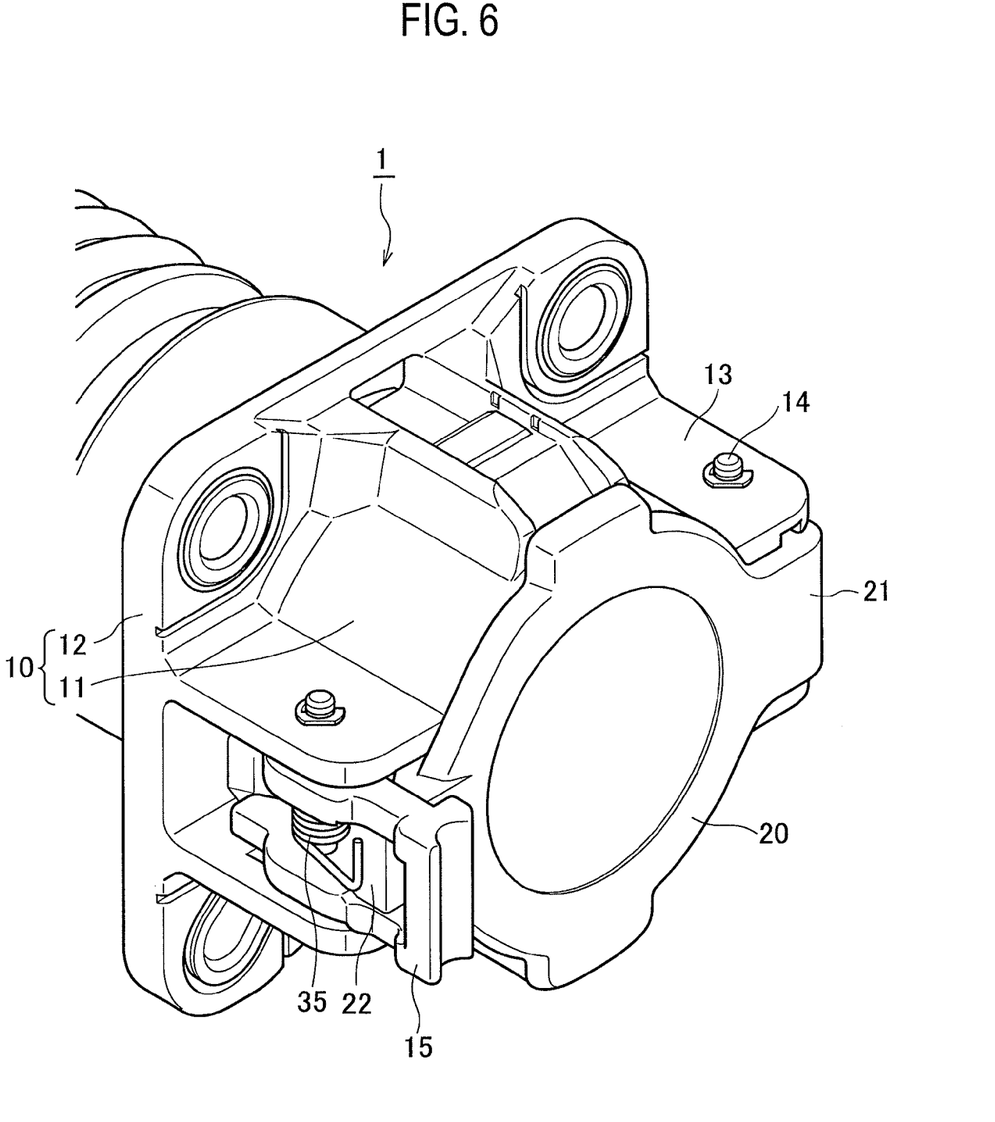
FIG. 6 is a perspective view illustrating the charging inlet device using the spring hook structure according to the embodiment when the cap is located in a closed position.

The cap 20 is formed substantially into a disk shape. The cap 20 includes a support portion 21 on one side thereof and a locked portion 22 on the other side. The support portion 21 is rotatably supported by the rotation support pin 14. The cap 20 is thus supported to be rotatable between a closed position where the cap 20 blocks the terminal insertion holes 4 and the fitting space S (as illustrated in FIG. 6) and an open position where the cap 20 is separated from the front wall 3 of the connector housing 2 and the front end of the exterior case 10 to open the terminal insertion holes 4 and the fitting space S to the outside (as illustrated in FIG. 5). The cap 20 is biased by a spring hook structure toward the open position in the direction away from the exterior case 10. The spring hook structure is explained in detail later.

When the cap is rotated from the open position to the closed position, the locked portion 22 of the cap 20 is locked with the cap locking portion 15. The cap 20 is thus held in the closed position.

A packing 25 formed substantially into a disk shape is placed on the inner surface of the cap 20. The packing 25 has a diameter set to be identical with or slightly larger than that of the front end of the exterior case 10. When the cap 20 is located in the closed position, the packing 25 is directly attached to the front wall 3.

The packing 25 is formed of a light member in view of reduction in weight of the vehicle and a highly-elastic member, such as foam rubber, in view of elimination of gaps (sealing performance) and prevention of unstableness (prevention of noise).

As illustrated in FIGS. 7A, 7B, 8A and 8B, the spring hook structure includes a torsion coil spring 30. The torsion coil spring 30 includes a coil portion 31 densely wound in a spiral state, a first arm 32 extending from one side of the coil portion 31, and a second arm 33 extending from the other side of the coil portion 31. The rotation support pin 14 is inserted into the coil portion 31. The respective arms 32 and 33 are substantially straight, and tip portions 32a and 33a thereof are each bent at a right angle. The tip portion 32a of the first arm 32 is hooked on a first hook surface 16 of the exterior case 10. The tip portion 33a of the second arm 33 is hooked on a second hook surface 26 of the cap 20. The torsion coil spring 30 biases the cap 20 toward the open position.

The exterior case 10 includes a first regulation wall 17 placed at a position not interfering with the first arm 32 moving along the first hook surface 16 when the coil portion 31 is subjected to flexural deformation but interfering with the first arm 32 moving along the first hook surface 16 when the first arm 32 is subjected to flexural deformation. The cap 20 includes a second regulation wall 27 placed at a position not interfering with the second arm 33 moving along the second hook surface 26 when the coil portion 31 is subjected to flexural deformation but interfering with the second arm 33 moving along the second hook surface 26 when the second arm 33 is subjected to flexural deformation.

Next, an open-close action of the cap 20 in the charging inlet device is explained below.

When the cap 20 is located in the open position and is then turned from the open position to the closed position against the spring force of the torsion coil spring 30, the locked portion 22 of the cap 20 is locked with the cap locking portion 15. The cap 20 is thus held in the closed position. When the cap 20 moves from the open position to the closed position, the respective regulation walls 17 and 27 do not interfere with the torsion coil spring 30 because, under normal conditions, the coil portion 31 is subjected to torsion deformation so that the respective arms 32 and 33 hardly slide along the respective hook surfaces 16 and 17.

When the cap 20 is located in the closed position, and the lock of the cap locking portion 15 is released, the cap 20 is turned from the closed position to the open position due to the spring force of the torsion coil spring 30. The user is thus not required to open the cap 20 by hand. When the cap 20 moves from the closed position to the open position, the respective regulation walls 17 and 27 do not interfere with the torsion coil spring 30 because, under normal conditions, the coil portion 31 is subjected to torsion return deformation so that the respective arms 32 and 33 hardly slide along the respective hook surfaces 16 and 17.

In the above-mentioned action, there is a case where moisture such as rainwater that adheres to the coil portion 31 when the cap 53 is located in the open position freezes, which prevents the torsional movement of the coil portion 31. Further, if the user moves the cap 20 from the open position to the closed position in the state where the coil portion 31 cannot freely rotate, an excessive load acts on the respective arms 32 and 33.

Figure 8A:
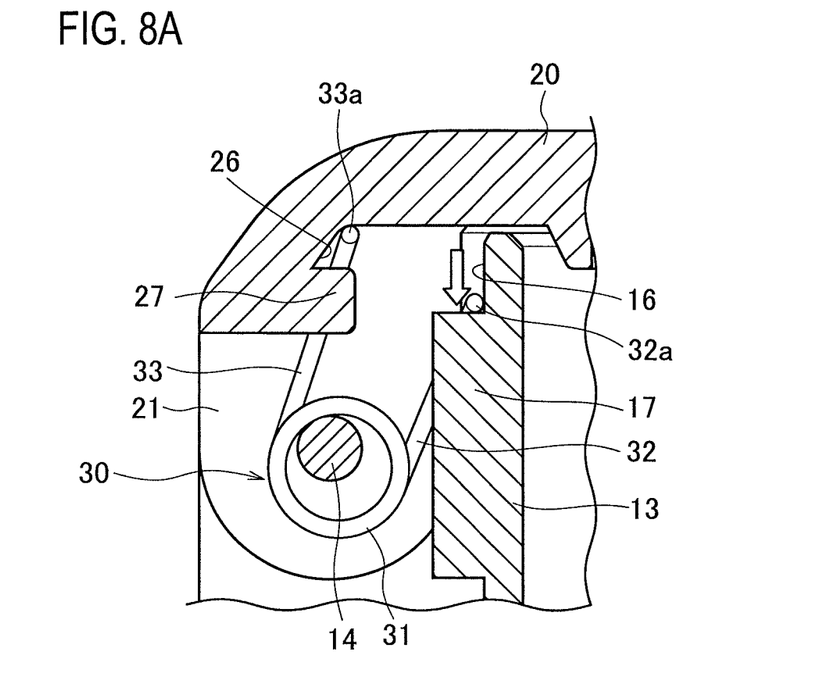
FIG. 8A is a cross-sectional view illustrating the spring hook structure according to the embodiment while explaining a movement of a first arm when an excessive load acts on the first arm.

As a result, for example, the tip portion 32a of the first arm 32 slides on the first hook surface 16 while the first arm 32 is subjected to flexural deformation, as illustrated in FIG. 8A. However, the tip portion 32a of the first arm 32 comes into contact with the first regulation wall 17 so that the sliding movement thereof is blocked. Thus, excessive flexural deformation, namely, plastic deformation of the first arm 32 is prevented. Accordingly, the tip portion 32a of the first arm 32 is prevented from falling off the first hook surface 16.

Figure 8B:
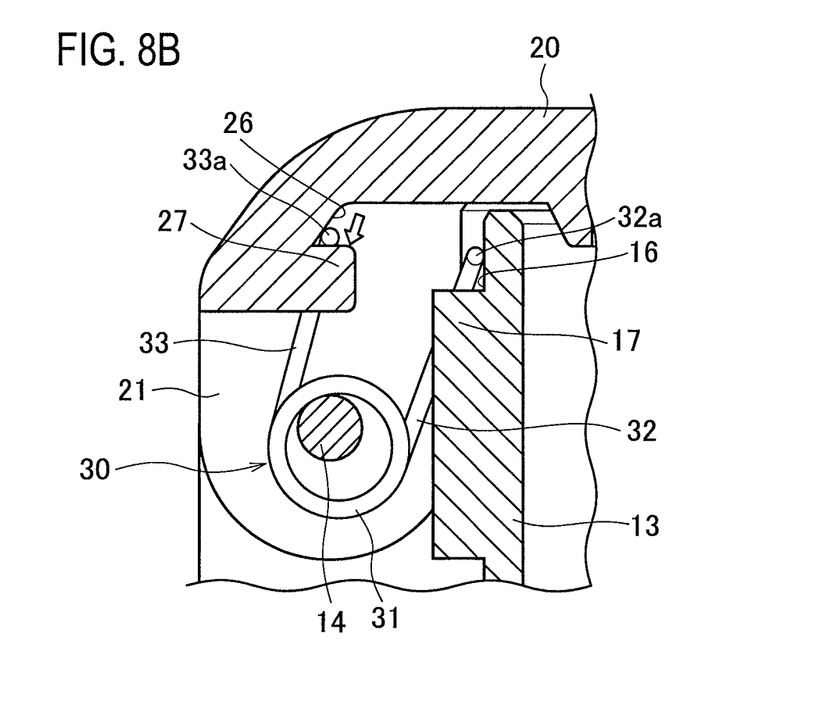
FIG. 8B is a cross-sectional view illustrating the spring hook structure according to the embodiment while explaining a movement of a second arm when an excessive load acts on the second arm.

In addition, for example, the tip portion 33a of the second arm 33 slides on the second hook surface 26 while the second arm 33 is subjected to flexural deformation, as illustrated in FIG. 8B. However, the tip portion 33a of the second arm 33 comes into contact with the second regulation wall 27 so that the sliding movement thereof is blocked. Thus, excessive flexural deformation, namely, plastic deformation of the second arm 33 is prevented. Accordingly, the tip portion 33a of the second arm 33 is prevented from falling off the second hook surface 26.

As described above, the respective regulation walls 17 and 27 prevent the respective arms 32 and 33 from being subjected to excessive flexural deformation or falling off the respective hook surfaces 16 and 26. Such flexural deformation of the respective arms 32 and 33 of the torsion coil spring 30 can be prevented only by the provision of the first regulation wall 17 to the exterior case 10 and the provision of the second regulation wall 27 to the cap 20. A slight change of design of the exterior case 10 is thus only required to add the first regulation wall 17 and the second regulation wall 27, which leads to hardly any increase in cost. Accordingly, damage of the torsion coil spring 30 caused by excessive deformation thereof can be prevented even if moisture adhering thereto freezes while an increase in cost is prevented.

In the spring hook structure according to the embodiment, the first regulation wall 17 is formed in the exterior case 10, and the second regulation wall 27 is formed in the cap 20. However, one of the exterior case 10 and the cap 20 may be provided with a regulation wall when the structure is under the condition where there is a risk that moisture freezes only on one side of the coil portion 31.

Figure 7A:
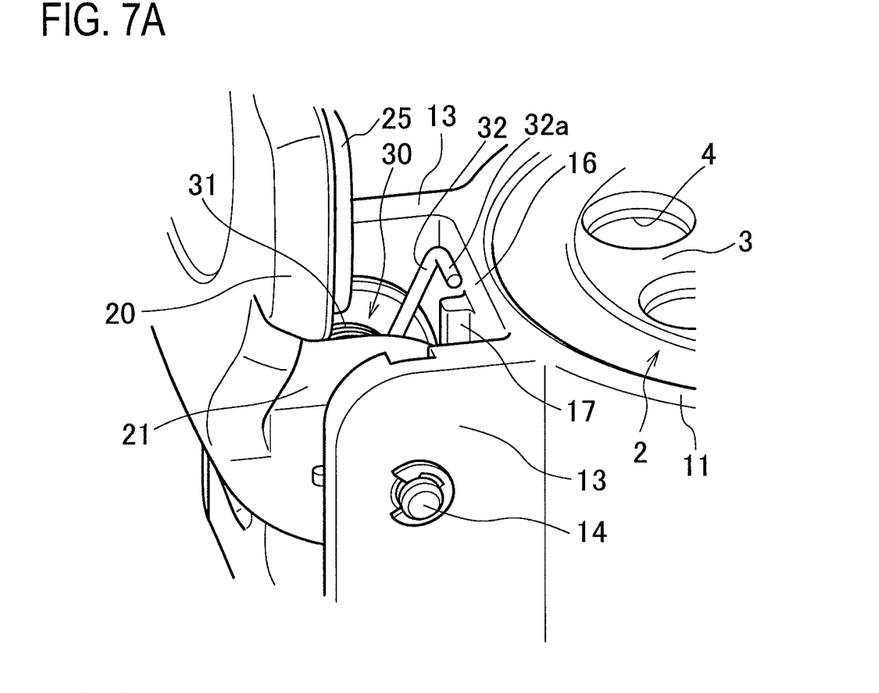
FIG. 7A is a perspective view around a first hook surface and a first regulation wall of an exterior case in the spring hook structure according to the embodiment.
Figure 7B:
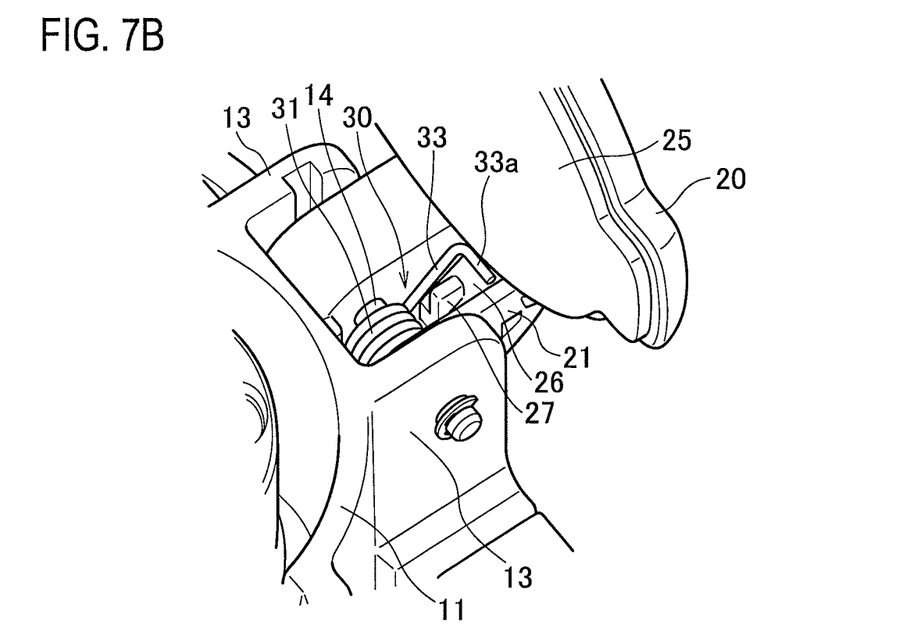
FIG. 7B is a perspective view around a second hook surface and a second regulation wall of the cap in the spring hook structure according to the embodiment.

In the spring hook structure according to the embodiment, the torsion coil spring 30 can be attached in a manner such that the rotation support pin 14 is inserted into the coil portion 31, the tip portion 32a of the first arm 32 is placed on the first hook surface 16, and the tip portion 33a of the second arm 33 is placed on the second hook surface 26. Therefore, the spring hook structure according to the embodiment can keep the facilitation of attachment of the torsion coil spring 30 as in the case of the spring hook structure of the conventional example.

The spring hook structure according to the embodiment is applied to the open-close structure of the cap 20 in the charging inlet device 1, wherein the fixed member is the exterior case 10 placed to cover the peripheral surface of the connector housing 2, and the movable member is the cap 20 placed to open and close the terminal insertion holes 4 of the connector housing 2. However, the present invention is not limited thereto and may be applied to any device in which the coil spring 30 is interposed between a fixed member and a movable member rotatably supported on the fixed member.

What is claimed is:

1. A spring hook structure interposed between a fixed member and a movable member rotatably supported on the fixed member, the spring hook structure comprising:

a torsion coil spring comprising a coil portion, a first arm extending from one side of the coil portion, and a second arm extending from the other side of the coil portion;

a rotation support pin by which the movable member is rotatably supported on the fixed member, the rotation support pin being inserted into the coil portion;

a first hook surface on which a tip portion of the first arm is hooked, the first hook surface being formed in the fixed member;

a second hook surface on which a tip portion of the second arm is hooked, the second hook surface being formed in the movable member;

a first regulation wall placed in the fixed member at a position not interfering with the tip portion of the first arm moving along the first hook surface when the coil portion is subjected to flexural deformation but interfering with the tip portion of the first arm moving along the first hook surface when the first arm is subjected to flexural deformation; and a second regulation wall placed in the movable member at a position not interfering with the tip portion of the second arm moving along the second hook surface when the coil portion is subjected to flexural deformation but interfering with the tip portion of the second arm moving along the second hook surface when the second arm is subjected to flexural deformation, wherein when the movable member rotates about the rotation support pin, the first regulation wall prevents the tip portion of the first arm from moving along the first hook surface once the tip portion of the first arm starts moving along the first hook surface while the first arm is subjected to the flexural deformation, and the second regulation wall prevents the tip portion of the second arm from moving along the second hook surface once the tip portion of the second arm starts moving along the second hook surface while the second arm is subjected to the flexural deformation.

2. The spring hook structure according to claim 1, wherein the fixed member is an exterior case placed to cover a peripheral surface of a connector housing, and the movable member is a cap placed to open and close a terminal insertion hole in the connector housing.

* * * * *